(12) United States Patent
Bartosch et al.

(10) Patent No.: US 8,359,860 B2
(45) Date of Patent: Jan. 29, 2013

(54) DRIVE TRAIN OF A MOTOR VEHICLE WITH A COMPRESSED-AIR SYSTEM

(75) Inventors: Stephan Bartosch, Rammingen (DE); Jürgen Berger, Gerstetten (DE); Christian Bausch, Bubesheim (DE)

(73) Assignee: Voith Patent GmbH, Heidenheim (DE)

( * ) Notice: Subject to any disclaimer, the term of this patent is extended or adjusted under 35 U.S.C. 154(b) by 963 days.

(21) Appl. No.: 12/393,517

(22) Filed: Feb. 26, 2009

(65) Prior Publication Data

US 2009/0211254 A1 Aug. 27, 2009

Related U.S. Application Data

(63) Continuation of application No. PCT/EP2008/000436, filed on Jan. 22, 2008.

(30) Foreign Application Priority Data

Feb. 5, 2007 (DE) .......................... 10 2007 006 420

(51) Int. Cl.
*F01K 23/10* (2006.01)
*F01K 15/00* (2006.01)
(52) U.S. Cl. .............................. 60/618; 60/668; 60/716
(58) Field of Classification Search .................... 60/614, 60/616, 618, 668, 670, 676, 716
See application file for complete search history.

(56) References Cited

U.S. PATENT DOCUMENTS

| | | | | |
|---|---|---|---|---|
| 4,182,127 | A * | 1/1980 | Johnson | 60/618 |
| 5,351,487 | A * | 10/1994 | Abdelmalek | 60/618 |
| 5,549,174 | A * | 8/1996 | Reis | 180/165 |
| 6,301,890 | B1 * | 10/2001 | Zeretzke | 60/616 |
| 7,454,910 | B2 * | 11/2008 | Hamada et al. | 60/618 |
| 7,454,911 | B2 * | 11/2008 | Tafas | 60/618 |

FOREIGN PATENT DOCUMENTS

| | | |
|---|---|---|
| DE | 3021691 A1 | 4/1981 |
| DE | 32 45 351 A1 | 6/1984 |
| DE | 19706090 A1 | 8/1998 |
| DE | 10103403 C1 | 1/2002 |
| DE | 10221157 A1 | 12/2003 |
| DE | 10 2007 006 420 A1 | 8/2008 |
| EP | 1 987 246 B1 | 3/2012 |
| GB | 644 759 | 10/1950 |
| GB | 2 080 432 A | 2/1982 |
| GB | 2333584 A | 7/1999 |
| WO | 85 02228 A1 | 5/1985 |

OTHER PUBLICATIONS

PCT/EP2008/000436 International Preliminary Report.
English translation of International Search Report dated Apr. 16, 2008 for PCT/EP2008/000436 (2 pages).
English translation of International Preliminary Report on Patentability dated Sep. 8, 2009 for PCT/EP2008/000436 (5 pages).

(Continued)

*Primary Examiner* — Hoang Nguyen
(74) *Attorney, Agent, or Firm* — Taylor IP, P.C.

(57) ABSTRACT

A drive train for a motor vehicle includes: a vehicle drive engine for driving the motor vehicle via a vehicle drive shaft driven by a vehicle drive engine; and a compressor which can be driven optionally or permanently for compressing air for a compressed-air system of the motor vehicle. The compressor is associated with at least one drive unit in the form of a steam-driven expansion machine by which the compressor can be driven.

17 Claims, 7 Drawing Sheets

OTHER PUBLICATIONS

English translation of Written Opinion of the International Searching Authority on Patentability (undated) for PCT/EP2008/000436 (4 pages).

Communication dated May 17, 2010 from European Patent Office for Application No. EP 08 707 169.2-2311 (3 pages).

* cited by examiner

DRIVE TRAIN OF A MOTOR VEHICLE WITH A COMPRESSED-AIR SYSTEM

CROSS REFERENCE TO RELATED APPLICATIONS

This is a continuation of PCT application No. PCT/EP2008/000436, entitled "MOTOR VEHICLE DRIVE TRAIN COMPRISING A COMPRESSED AIR SYSTEM", filed Jan. 22, 2008, which is incorporated herein by reference.

BACKGROUND OF THE INVENTION

1. Field of the Invention

The present invention relates to a drive train of a motor vehicle with a compressed-air system, with a compressor being provided for compressing air for the compressed-air system.

2. Description of the Related Art

Motor vehicles and compressed-air systems as relate to the present invention are known. A motor vehicle shall be understood as being any vehicle driven by way of motive power, irrespective of whether it is arranged as a road vehicle, rail vehicle, ship or other way of transport. The term compressed-air system, which is used for supplying compressed-air brakes for example, includes especially closed systems which are especially filled by way of compressed ambient air, but is not limited thereto.

In order to fill such a compressed-air system of a motor vehicle or to build up and maintain the pressure, at least one compressor is provided conventionally which is usually arranged as a reciprocating piston engine and which is driven by the drive motor of the vehicle, which is usually a combustion engine, either permanently or optionally when a respective coupling is provided.

As a result of the comparatively high pressure states in such compressed-air systems, e.g. 10 to 12.5 bar, the required drive power of the compressor is considerable and can quickly reach 5 kW or more. This power, if it needs to be provided by the combustion engine, leads on the one hand to increased fuel consumption per mileage covered by the vehicle and on the other hand to the fact that the respective power cannot be used for the drive of the motor vehicle whenever the compressor is in operation.

Document DE 30 21 691 A1 describes a drive train for a motor vehicle including: a vehicle drive engine for driving the motor vehicle via a vehicle drive shaft driven by a vehicle drive engine; and a compressor which can be driven optionally or permanently for compressing air for a compressed-air system of the motor vehicle, with the compressor being associated with at least one drive unit in the form of a steam-driven expansion machine by which the compressor can be driven.

GB 2 333 584 A discloses an exhaust-gas heat recovery system for an internal combustion engine, with the exhaust gases forming the heat source of a steam turbine which drives the piston compressor of the air-conditioning system.

DE 102 21 157 A1 describes a steam turbine which drives a compressor. The compressor compresses the aspirated ambient air to a specific final pressure.

What is needed in the art is a drive train for a motor vehicle with a compressed-air system and a compressor for compressing air for the compressed-air system, by way of which the compressor can be driven in a more energy-saving manner and at least partly without impairing the drive power of the motor vehicle. A compact embodiment which can be produced at low cost shall advantageously be created.

SUMMARY OF THE INVENTION

The present invention provides a drive train for a motor vehicle including: a vehicle drive engine for driving the motor vehicle via a vehicle drive shaft driven by a vehicle drive engine; and a compressor which can be driven optionally or permanently for compressing air for a compressed-air system of the motor vehicle, with the compressor being associated with at least one drive unit in the form of a steam-driven expansion machine by which the compressor can be driven, wherein the compressor can be or is driven by means of the vehicle drive engine and/or an additional drive, and that the steam-driven expansion machine is associated with the compressor as a second drive unit with which the compressor can be additionally driven.

The drive train for motor vehicles in accordance with the invention includes at least one drive engine for driving the motor vehicle via a vehicle drive shaft driven by the same. The drive engine can be arranged as a combustion engine for example, especially a diesel engine. Other embodiments are also possible, e.g. electromotors, hybrid motors, steam-driven motors or the like.

A compressor is provided in accordance with the invention, by way of which the air (generally a medium) can be compressed for a compressed-air system of the motor vehicle. The compressor can optionally be driven especially by the combustion engine or is driven by the same permanently.

A drive unit in the form of a steam-driven expansion machine is further provided for driving the compressor, through which the compressor can be driven. The expansion machine can be provided as a second drive unit in addition to the vehicle drive engine, especially the combustion engine, or an electromotor.

Both the expansion machine as well as the compressor can be arranged as a piston engine, but this is not mandatory. A rotary combustion engine or a reciprocating piston engine is considered which is arranged in single-stage, double-stage or multi-stage configuration. One cylinder is accordingly provided in reciprocating piston engines, or two or more cylinders. A respective number of compression chambers can be provided in rotary combustion engines. It is understood that other forms of expansion machines can be considered, e.g. a turbomachine or a turbine.

It is especially advantageous when the expansion machine is additionally in a driving connection with the vehicle drive shaft or can be switched to such a connection in order to drive the motor vehicle and/or other units of the motor vehicle. As a result, the drive power of the expansion machine can be used in addition to or instead of the drive power of the drive engine of the vehicle for accelerating the vehicle or driving further units.

The expansion machine is usually arranged in a steam circulation which includes a steam generator, a condenser and a fluid pump. The working medium of the steam circulation is evaporated in the steam generator, thereafter supplied to the expansion machine in which it is expanded or relaxed. The expanded steam which is derived from the expansion machine is then supplied to the condenser in which it is condensed. Finally, a fluid pump pumps the fluid working medium back to the steam generator. It is possible but not mandatory to provide a condensate or fluid storage element or other storage means in the steam circulation for intermediate storage of the working medium.

In an embodiment which is especially advantageous from an energy standpoint, the steam generator can be supplied with waste heat from the vehicle's drive engine, especially the combustion engine, so that the working medium of the steam circulation is evaporated at least partly or completely by the waste heat of the vehicle's drive engine. The waste heat can be guided in different ways to the steam generator or into the steam circulation. For example, a cooling medium for the vehicle's drive engine such as the cooling water can be used which is guided accordingly through the steam generator. When the vehicle's drive engine is arranged as a combustion engine, it is additionally or alternatively possible to use heat from the exhaust gases of the combustion engine for generating steam in the steam generator.

According to a further embodiment, a burner is additionally or alternatively provided in order to generate steam in the steam generator by way of combustion heat. The burner can be operated with the fuel of the combustion engine for example.

Since heat is obtained in the compression of air in the compressor which until now frequently needed to be "cooled off" in a complex manner by way of cooling water or other cooling systems, this heat of the compressor is used according to an especially advantageous embodiment of the present invention for generating the steam for the expansion machine. For this purpose, heat is diverted from the compressor by a suitable medium and supplied to the steam circulation, especially in the direction of the working medium flow in the steam circulation behind the fluid pump and before the steam generator. It is alternatively or additionally possible to guide the steam circulation through the compressor, which means that the working medium of the steam circulation is guided through the compressor, especially through its housing or, when arranged as a reciprocating piston engine, through its cylinder head or cylinder heads, so that heat transmission of the compression heat occurs directly to the working medium of the steam circulation or via an intermediate medium.

In order to provide a cost-effective and especially compact arrangement, the expansion machine and the compressor can be arranged both in a common as well as separate housings. Each machine, which means expansion machine and compressor, can include a separate shaft, which means an expansion machine output shaft and a compressor drive shaft. They are arranged separate from each other. The two shafts can be arranged next to one another in the axial direction, but advantageously in alignment with each other. It is alternatively also possible to arrange the shafts in the radial direction adjacent to one another or concentric to one another in an especially advantageous manner. The latter is achieved in such a way for example that at least one of the two shafts is arranged as a hollow shaft which encloses the other shaft which is also arranged as a hollow shaft or as a solid shaft.

Both the drive of the compressor by way of the vehicle's drive engine, especially a combustion engine, as well as the drive of the compressor by way of the steam-driven expansion machine can occur via a switchable mechanical clutch or hydrodynamic coupling. Two or more clutches that are separated from each other can be provided, or a clutch is arranged as a double clutch or multiple clutch which includes at least a first power interface for introducing drive power for the compressor, e.g. from the vehicle drive or combustion engine, and for guiding out power from the expansion machine to the vehicle drive shaft for example, a second power interface which is in a drive connection with the compressor for guiding out drive power for the compressor introduced via the first power interface, and a third power interface which is in a drive connection with the expansion machine for introducing drive power from the expansion machine.

When arranging the two machines, i.e. compressor and steam-driven expansion machine, in separate housings which especially can be connected with each other, at least one of the two machines or at least one of the two housings can be provided with a drive-through mechanism, which means it can include a second power input in addition to a power input through which the machine arranged in the housing can be driven, which second power input is connected with a power output especially on the opposite side of the housing, and is connected especially in a rigid way in order to transfer the drive power applied to the second power input to the power output. The power output can then be in a drive connection with the machine of the second housing in order to thus drive the machine of the second housing and in order to thus avoid a "power bypass" with gearwheel and/or belt/chain connections about the first housing.

The machines, which are the expansion machine and the compressor, in both housings can share one or several bearings, i.e. at least one bearing in or on the housing is used both for bearing the machine in the first housing as well as for bearing the machine in the second housing. Bearing of the machine shall at least be understood as the bearing of the drive shaft of the compressor or the drive shaft of the expansion machine. One or both of the shafts can be arranged as a crankshaft or also as linear shafts with cams or cam disks arranged thereon in order to achieve the necessary eccentricity in executing the machine as a piston machine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
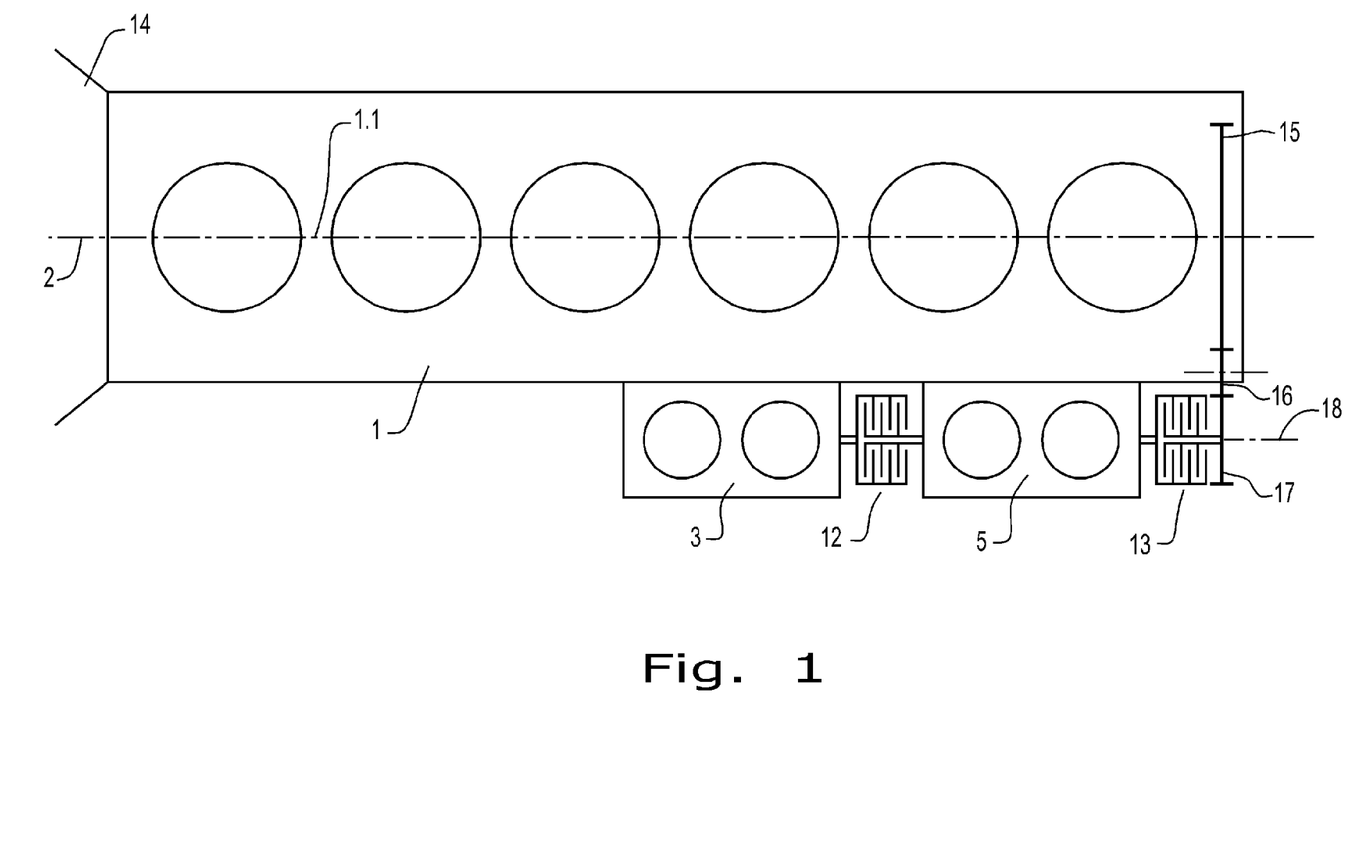
FIG. 1 shows a schematic view of the possible arrangement of compressor and expansion machine on the side of a combustion engine.

Referring now to the drawings, and more particularly to FIG. 1, there is shown a combustion engine 1 such as a diesel engine for driving the motor vehicle via a transmission 14 connected to the combustion engine 1. Combustion engine 1 drives a vehicle drive shaft 2 such as a transmission input shaft which is in a drive connection with the engine output shaft 1.1, which is present in the form of a crankshaft.

The transmission 14 is arranged on the rear side of the combustion engine 1 in the illustrated embodiment, and the engine output shaft 1.1 (crankshaft) reaches up to the front side of the combustion engine 1 on which it bears a gearwheel 15. The gearwheel 15 is in drive connection and in this case a combing engagement with the gearwheels 16 and 17, with the gearwheel 17 driving a secondary output shaft 18 of the combustion engine 1. Instead of the shown number of gearwheels, it is also possible to provide a different number of gearwheels or a belt drive, a chain drive or the like.

The secondary output shaft 18 or the gearwheel 17 can be switched optionally to a drive connection with the compressor 3 and the steam-driven expansion machine 5 in order to drive the compressor 3 or be driven by the expansion machine 5. As a result, either power can be introduced from the engine output shaft 1.1 into the compressor 3 for compressing air or drive power can be transmitted by expansion of steam in the expansion machine 5 to the engine output shaft 1.1 in order to drive the same and thus the vehicle.

In the embodiment as shown in FIG. 1, both the compressor 3 as well as the expansion machine 5 are each arranged as a two-step piston machine, which means as a piston machine which includes two cylinders. It is understood that it is also possible to vary the number of cylinders or the design. More or less cylinders can be provided or the machines can be arranged as rotary piston engines or as fans and pumps.

In the illustrated embodiment, the expansion machine 5 is further arranged between the compressor 3 and the front end of the combustion engine 1 with the drive of the secondary output shaft 18, and compressor 3 is driven via a drive-through mechanism by the expansion machine 5. This sequence could also be arranged the other way round, especially with a drive-through mechanism through the compressor 3 in order to transfer the drive output from the expansion machine 5 to the combustion engine output shaft 1.1.

The arrangement shown in FIG. 1 includes two clutches, namely a first clutch 12 by way of which the compressor 3 can be switched to a drive connection with the expansion machine 5 and/or the engine output shaft 1.1, and a second clutch 13 by way of which the expansion machine 5 can be switched to a drive connection with the drive engine output shaft 1.1. By respectively providing further clutches and/or drive connections or drive-through mechanisms it is also possible to arrange further units especially in alignment with the compressor 3 or the expansion machine 5 or parallel thereto, which units can be driven by the engine output shaft 1.1 and/or the expansion machine 5 or the engine output shaft 1.1 or generally the vehicle drive shaft 2 and/or the compressor 3. It would thus be possible to position a further unit laterally on the combustion engine 1 to the left of the compressor 3 in the illustration as shown in FIG. 1, which further unit is also driven by the secondary output shaft 18 or drives the secondary output shaft 18. Compressor 3 would need to be provided with a respective drive-through mechanism which is arranged at the end of compressor 3 opposite of the expansion machine 5. A further clutch could be provided for this purpose or one of the illustrated clutches could further include an additional power output. It would alternatively also be possible to provide a drive-through mechanism from the power input (at the right end in FIG. 1) of the secondary output shaft 18 to the further unit with or without clutches.

One or several of the shown and/or mentioned clutches could also be provided with a different configuration departing from the illustrated embodiment with the plate-assembly clutches, e.g. as simple dry-running friction clutches or hydrodynamic couplings.

In FIGS. 2 to 5 one can see different possibilities for configuring and arranging the compressor 3, the expansion machine 5 and the shafts, clutches and housings of the same. It is understood that further embodiments are possible. For example, the sequence of compressor 3 and expansion machine 5 can be exchanged.

Figure 2:
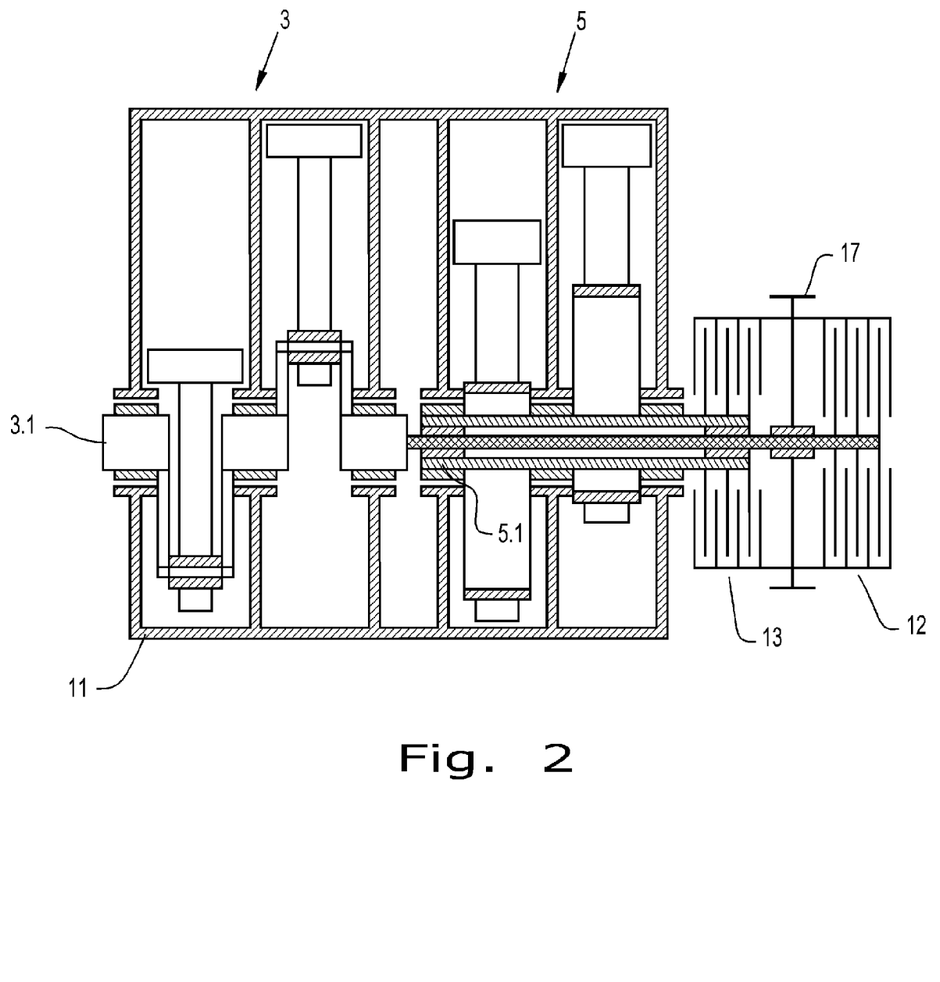
FIG. 2 shows a possible arrangement of the drive of the compressor and the expansion machine which are arranged in a common housing, via a double clutch.

According to FIG. 2, the drive power from the combustion engine (not shown) is transmitted via a double clutch, including the first clutch 12 and the second clutch 13, onto the compressor 3, which occurs when the first clutch 12 is closed. When the second clutch 13 is closed, drive power can be transmitted from the expansion machine 5 onto the gearwheel 17 (or any other suitable power train) in order to drive the engine output shaft (not shown) or generally a vehicle drive shaft. When both clutches 12, 13 are closed, drive power can be transmitted from the expansion machine 5 onto the compressor 3, optionally under separation of the power flow to or from the combustion engine by way of a further clutch (not shown). The double clutch thus has two power inputs and two power outputs, with one power input (in operation by the compressor 3 driven by the combustion engine) and one power output (in operation with vehicle driven by the expansion machine) being formed by the same interface, which in this case is the gearwheel 17 which is in drive connection with the housing of the double clutch.

The compressor 3 and the expansion machine 5 are arranged in a common housing 11 and are arranged axially adjacent to one another. The compressor 3 includes a compressor drive shaft 3.1 and the expansion machine 5 includes an expansion machine output shaft 5.1. The compressor drive shaft 3.1 is especially rigidly connected to a drive-through mechanism, e.g. a continuous shaft through the expansion machine 5, or is enclosed at least partly concentrically by the expansion machine output shaft 5.1. The compressor drive shaft 3.1 is held in three bearings, of which two each enclose a crank of the crankshaft in the axial direction between themselves on both sides, which crankshaft is arranged as a compressor output shaft 3.1. The compressor output shaft 5.1 is held accordingly. It is not arranged as a crankshaft, but as a straight shaft with applied eccentric disks.

Gearwheel 17 is held on the compressor output shaft 3.1 or held on the drive-through mechanism through the expansion machine 5 in a relative way.

Figure 3:
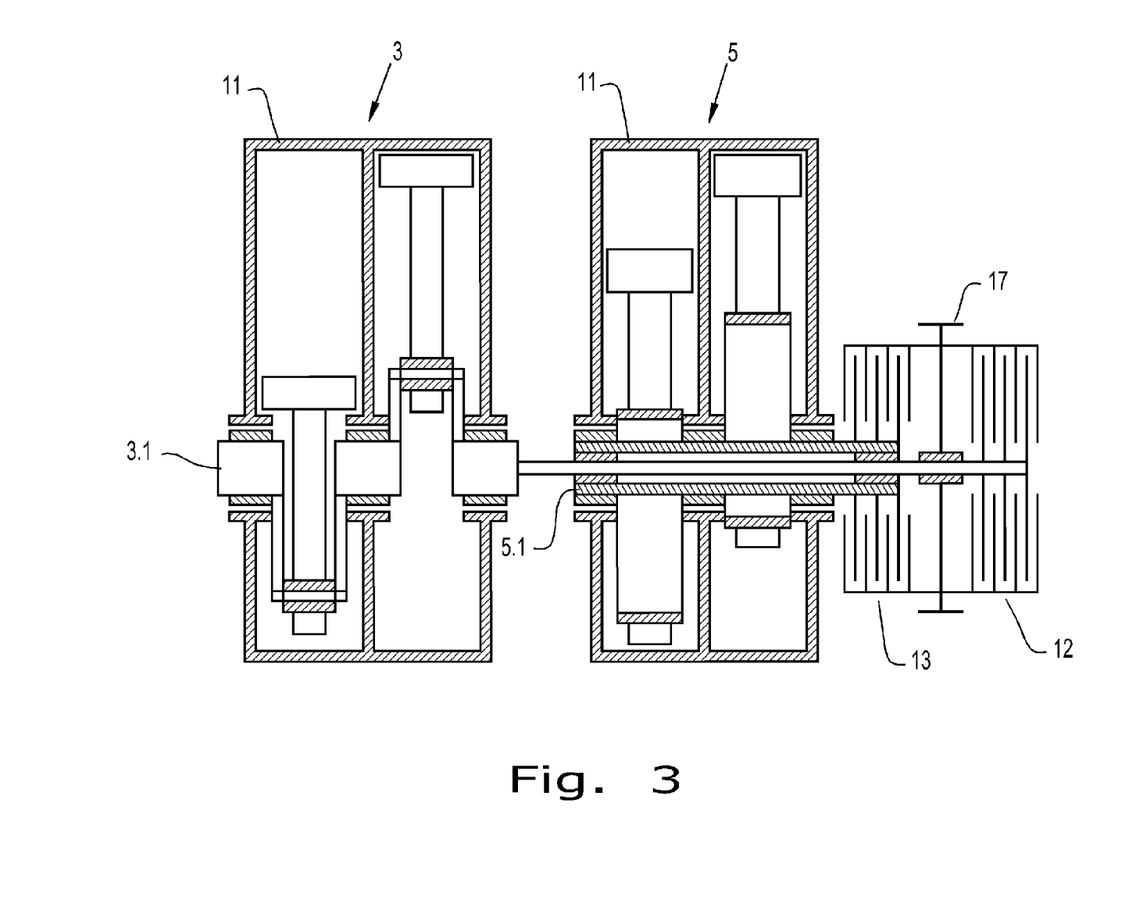
FIG. 3 shows an arrangement according to FIG. 2, but with separate housings for the expansion machine and the compressor.

The embodiment of FIG. 3 differs from that of FIG. 2 in such a way that the compressor 3 and the expansion machine 5 are held in separate housings 11, with a respective drive-through mechanism through the housing 11 of the expansion machine 5 being provided, which in this case is in the form of a rigid shaft which is enclosed by the expansion machine output shaft 5.1.

Figure 4:
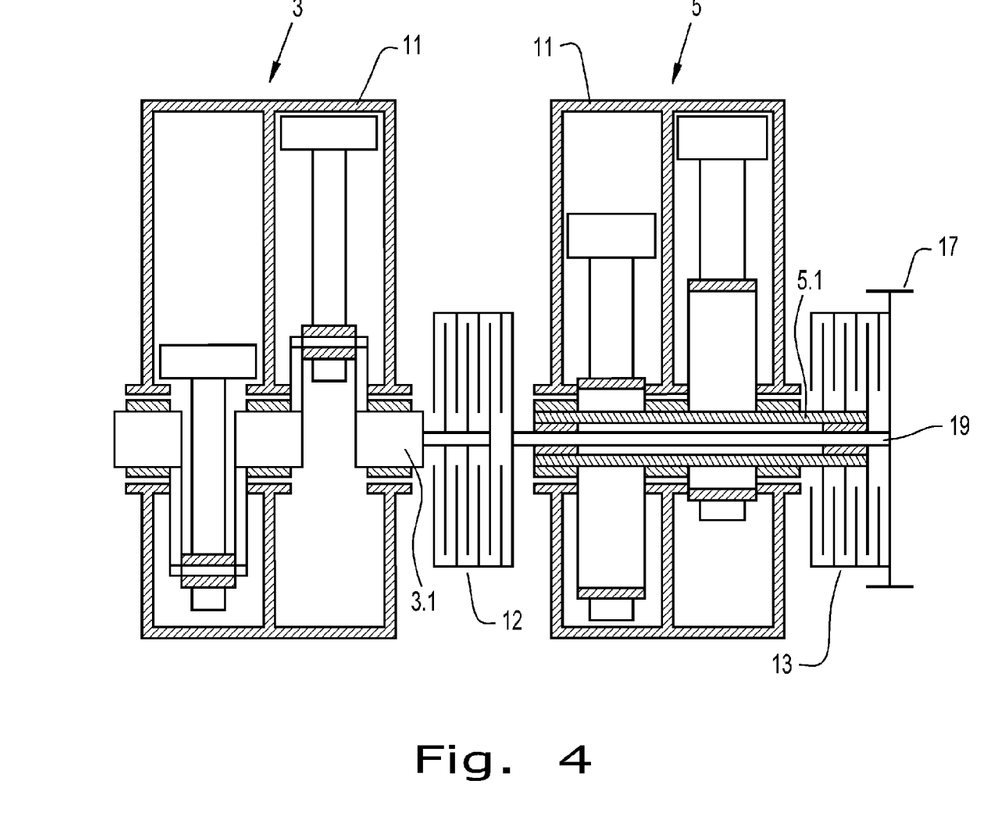
FIG. 4 shows an embodiment according to FIG. 3, but with two clutches provided separately from each other and a drive-through mechanism through one of the two housings, which in this case is the housing of the expansion machine.

According to FIG. 4, two individual clutches 12 and 13 which are arranged separately from each other are arranged instead of a double clutch. The first clutch 12 for switching in the compressor 3 is arranged between the housing 11 of the expansion machine 5 and the housing 11 of the compressor 3. It is understood that it would also be possible to arrange said first clutch 12 within one of the two housings 11, e.g. within the compressor housing. The second clutch 13 is arranged between the input of the secondary output shaft, which is in form of a gearwheel 17 here, and the housing 11 of the expansion machine 5, with the gearwheel 17 being connected in the present case in a rotationally rigid manner to the clutch 13. A drive-through mechanism through the expansion machine housing 11 is further provided, which here is provided in form of a rigid shaft 19 which is connected in a rotationally rigid manner with a half of the first clutch 12 or is in a drive connection with the same. The second half of the first clutch 12 is connected in a rotationally rigid manner to the compressor drive shaft 3.1.

The first half of the second clutch 13 is connected in a rotationally rigid manner to the expansion machine output shaft 5.1 or is in a drive connection with the same and the second half of the second clutch 13 is connected in a rotationally rigid manner to the gearwheel 17 or any other suitable drive connection.

Figure 5:
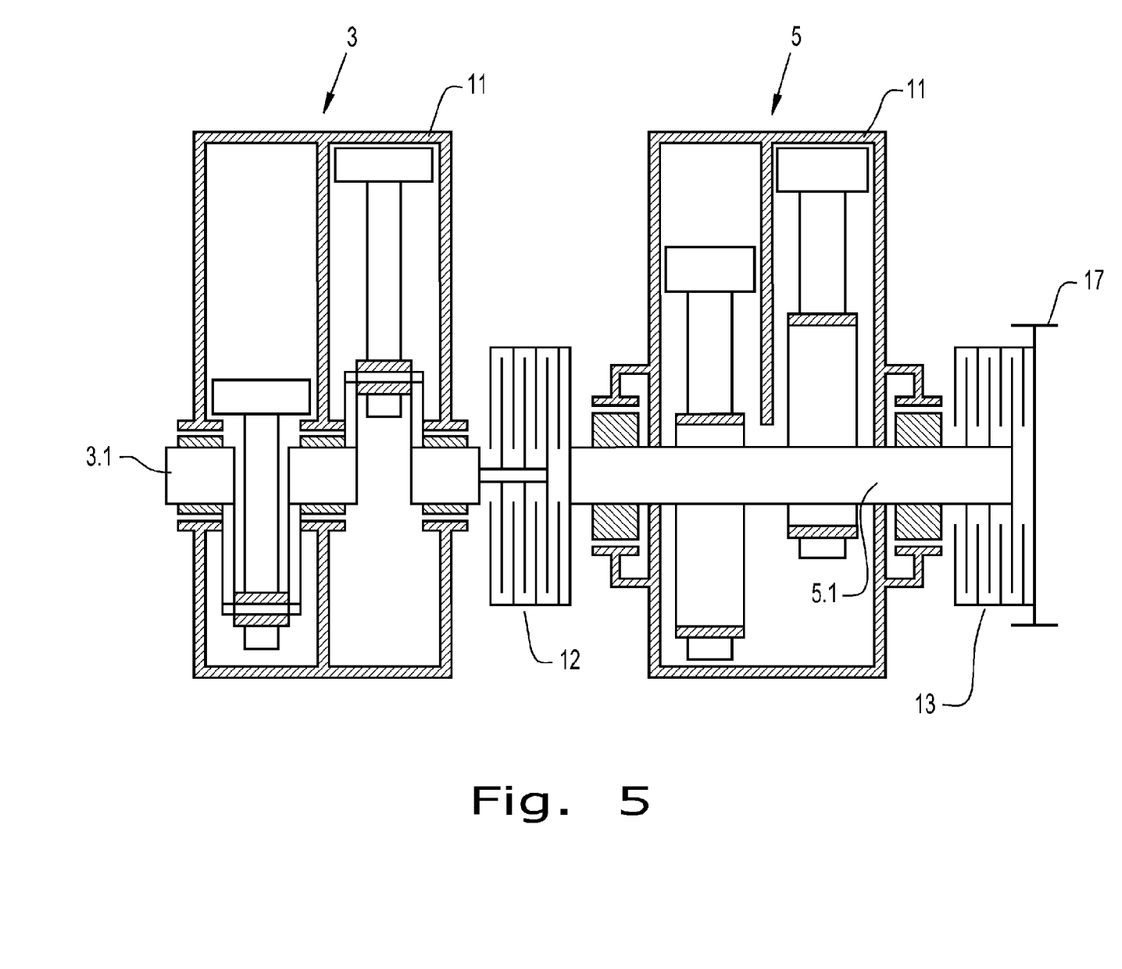
FIG. 5 shows an embodiment according to FIG. 4, but with a reduced number of bearings.

The embodiment according to FIG. 5 is characterized in that the expansion machine output shaft 5.1 is held exclusively by bearings outside of the housing 11 of the expansion machine 5, with said bearings being used especially for bearing a clutch half each of the two clutches 12, 13 which are arranged according to FIG. 4. Especially when the clutches 12, 13 are arranged as wet-running clutches, it is advantageous to lubricate these bearings with the same lubricating medium as the clutches 12, 13.

It is understood that departing from the illustration as shown in FIG. 5 it is also possible to hold the compressor output shaft 3.1 exclusively with bearings outside of the housing 11 of compressor 3, which will especially also assume an additional bearing function.

According to the embodiment in FIG. 5 it is thus possible that the bearings of one or two components (e.g. the clutches 12, 13) take up the bearing forces of a third component (e.g. the expansion machine 5 or its driven shaft 5.1).

Figure 6:
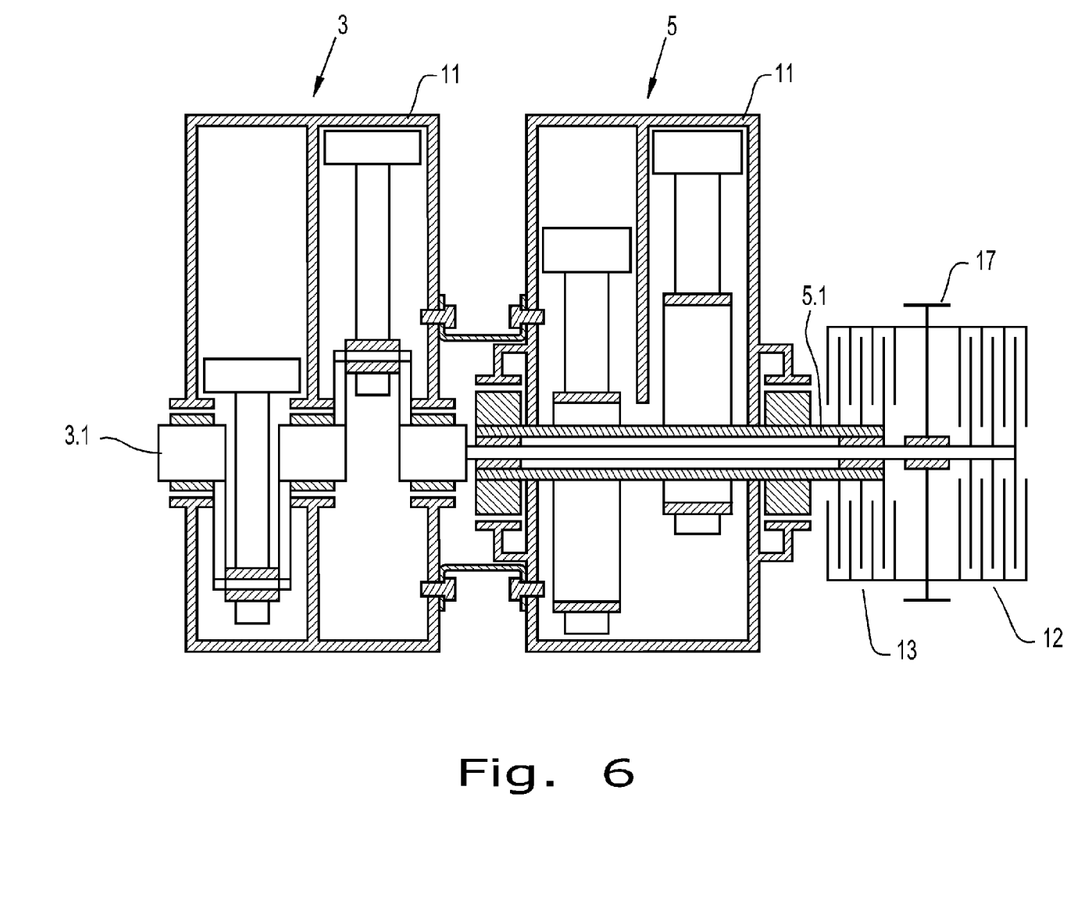
FIG. 6 shows an embodiment according to FIG. 5, but with a double clutch instead of two individual clutches.

According to the embodiment in FIG. 6, the two components take up the bearing forces of a third component, which in this case is expansion machine 5 again. The expansion machine output shaft 5.1 is held at one axial end or in the region of the axial end by a bearing which at the same time holds the first half of the second clutch 13. At the opposite axial end, the expansion machine output shaft 5.1 is held by a bearing which simultaneously acts as a bearing for the compressor drive shaft 3.1 or a respective drive-through mechanism through the expansion machine 5.

Departing from the illustration shown in FIG. 6, the outer bearing which is arranged in housing 11 of compressor 3 on the side adjacent to the crank facing the expansion machine 5 can be omitted because no further clutch is arranged between the expansion machine 5 and the compressor 3.

Figure 7:
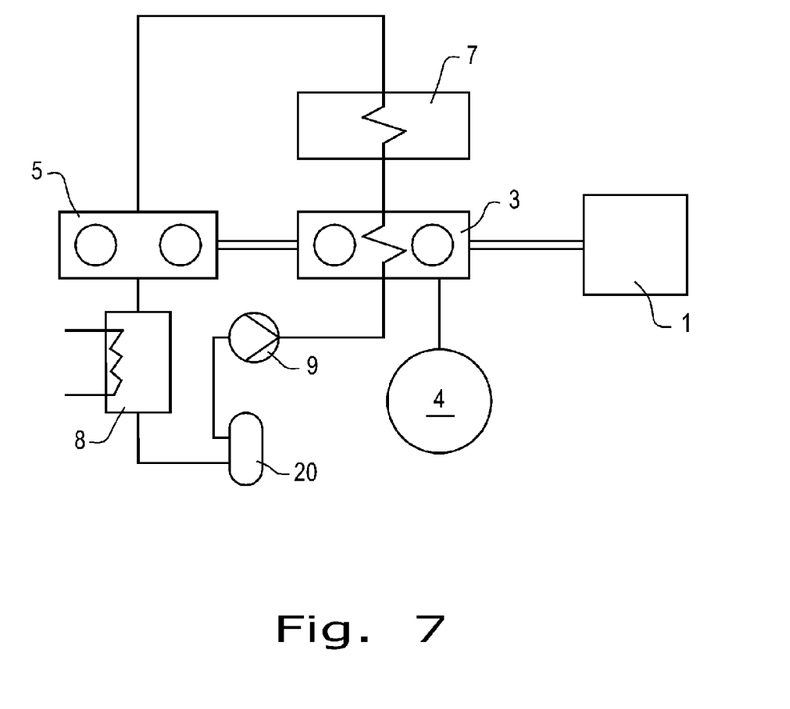
FIG. 7 shows a schematic view of a possible steam circulation.

FIG. 7 shows a typical steam circulation for the expansion machine 5. It includes in the following flow sequence: a storage reservoir 20, a fluid pump 9, a steam generator 7, the expansion machine 5, a condenser 8 from which the condensate flows into the storage reservoir 20 again. As is illustrated, the working medium of the steam circulation flows through the compressor 3 in a heat-conducting connection before it is supplied to the steam generator 7. The working medium can absorb the compression heat which is obtained when compressor 3 driven by the combustion engine 1 and/or the expansion machine 5 compresses air for the compressed-air system 4 and supplies it to the same.

As a result of the arrangement in accordance with the invention with a drive of the compressor for a compressed-air system of a motor vehicle by way of an expansion machine, it is possible to reduce the overall size and to utilize the heat of the compressor in an energetically useful way. Moreover, the expansion machine provides an especially high torque already at the lowest speeds especially when it is arranged as a reciprocating piston engine, especially at such a speed which facilitates the start-up of the compressor. It is especially no longer necessary to have the compressor work against ambient pressure at first when it is started. Instead, it can immediately supply the compressed-air system which has a pressure of between 8 and 12.5 bar or 10 and 12.5 bar for example. It is understood that deviating pressures and especially higher ones or lower pressures in the (partly) discharged state can prevail in the compressed-air system.

Deviating from the embodiments shown in the drawings, the compressor 3 can also be arranged parallel to the expansion machine 5, with the power flow to the compressor 3 and to the expansion machine 5 being arranged in parallel or in series with respect to one another in all embodiments.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A drive train of a motor vehicle, said drive train comprising:
    a vehicle drive shaft;
    a vehicle drive engine configured for driving the motor vehicle via said vehicle drive shaft driven by said vehicle drive engine;
    a compressor configured for being driven one of periodically and permanently and for compressing air for a compressed-air system of the motor vehicle;
    a plurality of compressed-air brakes of said compressed-air system, said plurality of compressed-air brakes being supplied with compressed air compressed by said compressor;
    at least one drive unit formed as a steam-driven expansion machine, said compressor being associated with at least one said drive unit formed as said steam-driven expansion machine by which said compressor is configured for being driven, said compressor being one of configured for being driven by and driven by way of at least one of said vehicle drive engine and an additional drive, said steam-driven expansion machine being associated with said compressor as a second drive unit with which said compressor is configured for being additionally driven.

2. The drive train according to claim 1, wherein said vehicle drive engine is a combustion engine, said additional drive being an electromotor.

3. The drive train according to claim 1, wherein at least one of said expansion machine and said compressor is arranged as a piston engine.

4. The drive train according to claim 3, wherein said piston engine is at least one of a rotary combustion engine and a reciprocating piston engine.

5. The drive train according to claim 1, wherein said expansion machine one of is in a drive connection with said vehicle drive shaft and is configured for being switched to said drive connection in order to drive the motor vehicle by way of said expansion machine.

6. The drive train according to claim 1, further comprising a steam circulation which includes a steam generator, a condenser, and a fluid pump, said expansion machine being arranged in said steam circulation, said vehicle drive engine being a combustion engine, said steam generator being supplied with one of a waste heat of said combustion engine and heat from a plurality of exhaust gases of said combustion engine.

7. The drive train according to claim 6, further comprising a burner configured for supplying said steam generator with combustion heat, said burner being driven with a fuel of said combustion engine.

8. The drive train according to claim 1, further comprising a common housing, said expansion machine and said compressor being arranged in said common housing.

9. The drive train according to claim 1, further comprising two separate housings, said expansion machine and said compressor being arranged respectively in said separate housings.

10. The drive train according to claim 1, wherein said expansion machine includes an expansion machine output shaft and said compressor includes a compressor drive shaft, said expansion machine output shaft and said compressor drive shaft being arranged separately from one another and being arranged next to one another.

11. The drive train according to claim 10, wherein said expansion machine output shaft and said compressor drive shaft are arranged next to one another at least one of in an axial direction, in alignment with each other, and one of adjacent and concentric relative to one another in a radial direction.

12. The drive train according to claim 10, further comprising a first clutch and a second clutch, wherein said vehicle drive engine is a combustion engine which includes an engine output shaft which can be switched into a drive connection with said compressor selectively via said first clutch, said drive connection being one of a purely mechanical drive connection and a hydrodynamic drive connection, said second clutch being provided in a power flow between said expansion machine output shaft and said compressor drive shaft, by way of which another drive connection can selectively be produced between said expansion machine output shaft and said compressor drive shaft, with said first clutch and said second clutch being arranged especially as a common double clutch with two power inputs and two power outputs, and one said power input and one said power output being formed by a same power interface.

13. The drive train according to claim 12, further comprising two separate housings and a drive-through mechanism, said expansion machine and said compressor being arranged respectively in said separate housings, said drive-through mechanism being provided in one of said two housings for one of said expansion machine and said compressor of said other housing.

14. The drive train according to claim 12, further comprising two separate housings and a bearing, said expansion machine and said compressor being arranged respectively in said separate housings, wherein one of said expansion machine output shaft and said compressor drive shaft is held by said bearing one of in, on, and adjacent to a respective other of said two housings and without a bearing in its own said housing.

15. The drive train according to claim 1, further comprising a steam circulation which includes a steam generator, a condenser, and a fluid pump, said expansion machine being arranged in said steam circulation, said vehicle drive engine being a combustion engine, said steam generator being supplied with one of a waste heat of said combustion engine and heat from a plurality of exhaust gases of said combustion engine, wherein heat is derived from said compressor and is supplied to said steam circulation behind said fluid pump and before said steam generator.

16. The drive train according to claim 15, further comprising a housing, wherein a medium of said steam circulation is guided in a heat-transmitting manner through a housing of said compressor.

17. The drive train according to claim 1, further including a steam circulation circuit including said steam-driven expansion machine and said compressor which is in series with said steam-driven expansion machine in said steam circulation circuit.

* * * * *